UNITED STATES PATENT OFFICE.

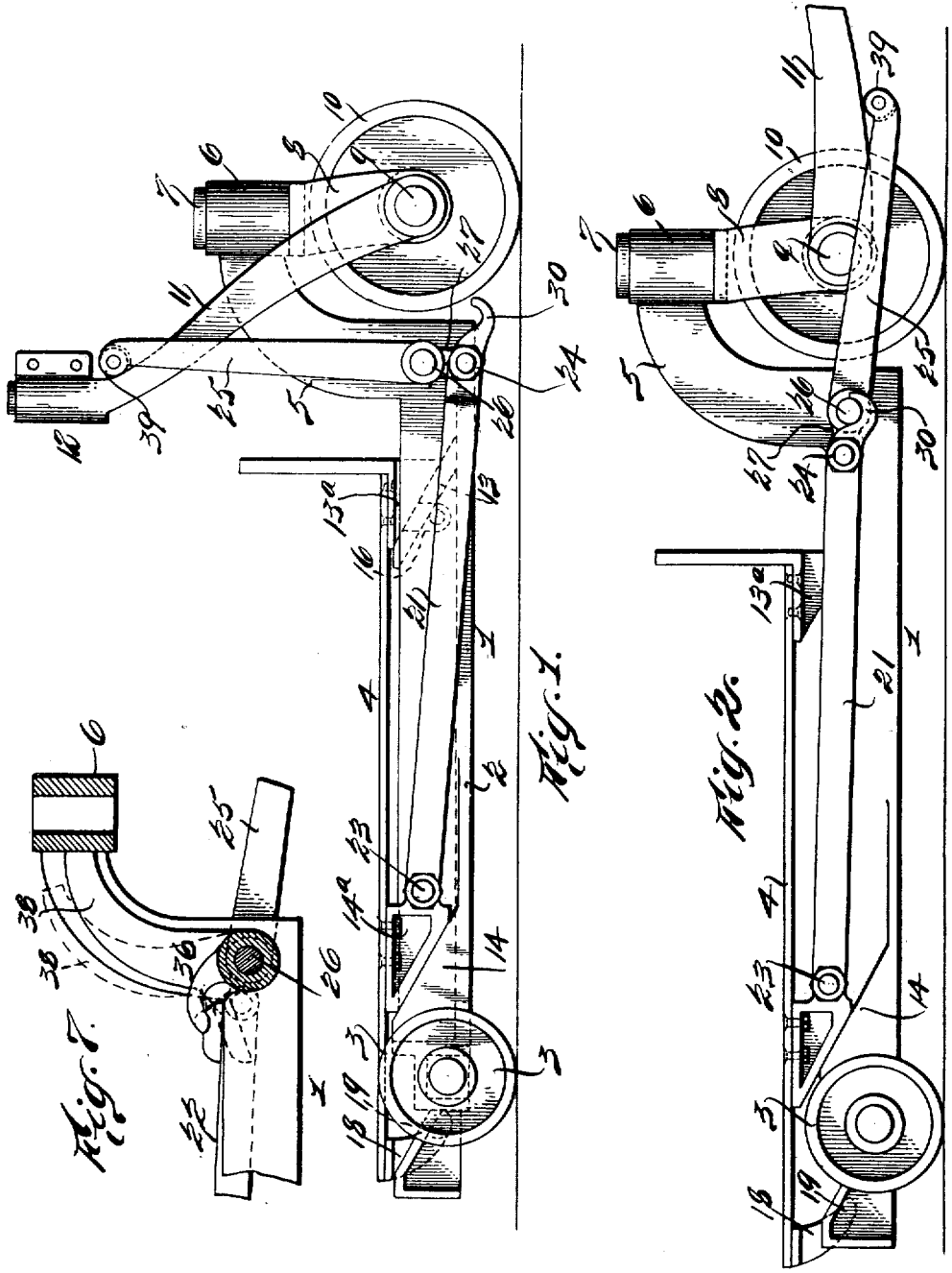

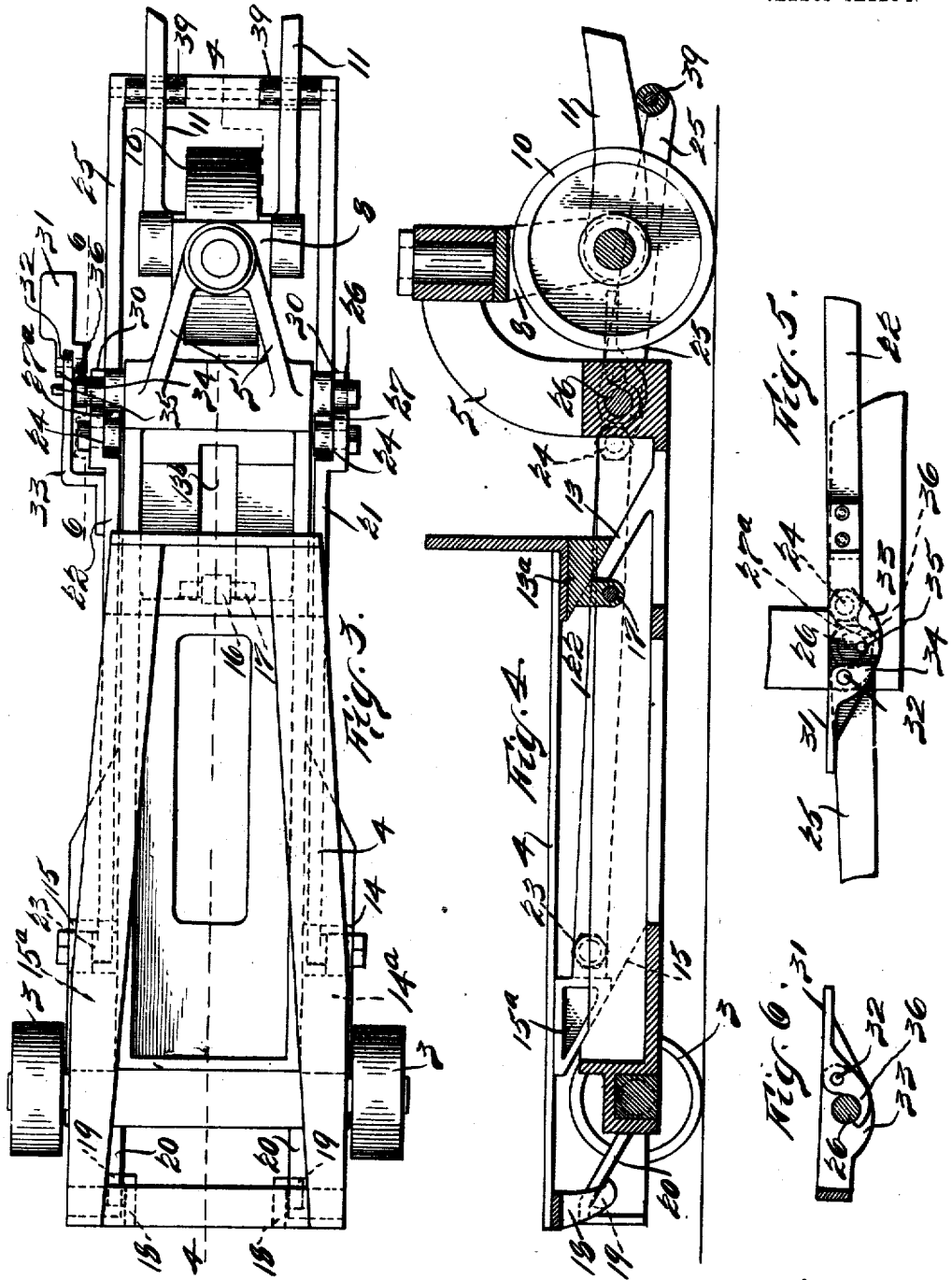

GEORGE P. TAYLOR, OF HOLYOKE, MASSACHUSETTS, ASSIGNOR, BY MESNE ASSIGNMENTS, TO HERBERT W. COWAN, J. LEWIS WYCKOFF, AND EDWARD N. WHITE, TRUSTEES.

TRUCK.

1,121,052.   Specification of Letters Patent.   Patented Dec. 15, 1914.

Application filed June 5, 1912. Serial No. 701,736.

*To all whom it may concern:*

Be it known that I, GEORGE P. TAYLOR, a citizen of the United States, residing at Holyoke, county of Hampden, State of Massachusetts, have invented certain new and useful Improvements in Trucks, of which the following is a clear, full, and exact description.

This invention relates to improvements in trucks such as are used in warehouses, factories and stores for the purpose of conveying goods or materials from one place to another.

One of the objects of the present invention is to provide a toggle mechanism so arranged and constructed that it will support and hold the elevating platform of the truck in elevated position, and to provide a handle or tongue for moving the truck and which is adapted to control the lowering of the load through the medium of the toggle mechanism when the latter is unlocked or released.

A further object of the invention is to provide manually operated trip mechanism operated independently of the toggle mechanism and handle or tongue which is adapted to release or "break" the toggle so that when the toggle mechanism is subjected to the weight of the load on the platform of the truck, the platform will lower to normal position under the control of the handle.

The truck is of that class usually known as an elevating truck, which is adapted to be pushed under an elevated support for a load and to be raised on the principle of a wagon-jack to raise the load and its support from the floor so that the same may be conveyed to some other point and deposited by the lowering of the movable platform of the truck.

Other objects of the invention are to provide a practical and efficient truck for the purposes similar to those mentioned.

These being among the objects of the present invention, the same consists of certain features of construction and combinations of parts to be hereinafter described and then pointed out in the claims with reference to the accompanying drawings which illustrate a suitable embodiment of the invention, and in which—

Figure 1 is a side elevation of the improved truck, with the parts in normal position, that is to say, the platform of the truck is lowered and the handle or tongue raised; Fig. 2 is a side elevation of the truck showing the same parts in position for supporting a load on the truck; Fig. 3 is a plan view of the truck, the parts being in the position shown in Fig. 2; Fig. 4 is a longitudinal section on the line 4—4 Fig. 3; Figs. 5 and 6 are detail views of a suitable trip mechanism; Fig. 6 being a section on the line 6—6 Fig. 4; Fig. 7 is a modification showing a stop device for the toggle.

Referring to Figs. 1 to 4 inclusive, the truck proper or base 1 comprises a body 2 which is provided with a pair of wheels 3—3 journaled thereon at one end. There is supported upon the body 2 a platform 4, said platform being so combined with the base and so coöperating therewith that it forms a supporting part of the truck, it being the part on which the load is to be carried. Said platform 4 is provided at that end of the truck opposite the wheels 3 with a bracket 5 which carries at its upper end a sleeve 6 in which is swiveled the spindle 7 of a fork 8 within which is mounted on axle 9 a caster-wheel 10. The said axle 9 is extended sufficiently at each side of the caster-wheel so that the bifurcations 11 of a handle or tongue 12 may have bearing on said axle, which therefore constitutes a pivot on which to swing the handle from its upstanding position, when the platform of the trunk is lowered, to its lower or horizontal position to raise the platform, or vice versa.

The platform 4 may be raised or lowered on the body 2 of the truck in any suitable manner. For this purpose there are preferably provided coöperating inclines, which as shown consist of upwardly and backwardly extending slideways 13, 14, 15, the slide-way 13 being located near the handle end of the truck, and the slideways 14, 15 being located at the opposite end, one at each side of the truck body. Resting upon and guided on these slide-ways are slides 13ª, 14ª and 15ª which are located on the underside of the platform 4 and are arranged so that the slide 13ª may be guided on the slideway 13, and the slides 14ª and 15ª on the slide-ways 14, 15. To prevent the tilting of either end of the platform and to positively guide the same upwardly and rearwardly, the platform carries at the end near the handle a downwardly projecting lug 16 which extends through a slot 13ᵇ in slide-way 13 and carries a cross-pin 17, the ends of which are guided on the underside of said slide-way; while the other end of the platform 4 carries downwardly projecting lugs 18 having side projections or studs 19 which engage with inclined flanges 20 at the rear end of the truck body. It is clearly obvious that any other suitable means for guiding the platform upwardly and downwardly relatively to the truck body may be employed.

A toggle mechanism for raising the platform is employed herein as in my co-pending application filed July 1, 1911, Serial No. 636,400, but there are certain improvements therein and in the parts which coöperate with the same which will now be described. The toggle mechanism is preferably duplicated at each side of the truck and comprises links 21, 22 which are respectively pivoted at their rear ends to the slide blocks 14ᵃ, 15ᵃ, at 23, while the forward ends of said links are pivoted at 24 to the yoke or toggle operating member 25. Said yoke or member 25 is fulcrumed or fixed on a pivot 26 and straddles the bracket 5, while it is provided with short arms or link members 27, 27ᵃ between which and the links 21, 22. the pivots 24 are raised. It will be seen that the handle or tongue 12 extends through the yoke or toggle operating member 25 so that it may be lowered and at the same time act to lower the yoke 25. The proportions of the links 21, 22 and 27, 27ᵃ and the location of the pivots 23, 24 and 26 to each other are such that the toggle is rendered effective to hold the platform in raised position as shown in Fig. 2 when the pivots 24 pass upwardly beyond a line extending directly between the pivots 23 and 26, so that the toggle is locked. In this position of the parts a lug or toe 30 which extends forwardly from one of the links 21, 22 is brought in contact with the pivot 26 which forms an abutment as shown in Fig. 2 so that the toggle holds the load raised.

Briefly described, the operation of the parts so far specified is as follows: The truck is pushed underneath the raised support which carries the goods or material to be transported, and the handle then being in upright position as shown in Fig. 1, it is pulled forwardly and lowered, which action also lowers the yoke or toggle operating member 25. This causes the longer extended links 21, 22 to push against the platform 4 which results in raising the load, and its support from the floor. When the handle 12 and the yoke 25 have been depressed sufficiently to move the pivots 24 across a line directly extending between the pivots 23, 26, the toggle will be rendered effective for the purpose of locking the platform and holding the load in raised position so that it may be transported. Of course at this point the toe 30 comes into play and is brought in contact with the pivot 26 to prevent reaction of the toggle mechanism. In the position of the parts shown in Fig. 2, when the load is raised and held above the floor by the truck, the handle 12 is free to be moved in any direction relatively to the yoke or toggle operating member 25. The handle may be thus moved because of its swivel connection with the truck and its pivotal connection at 9, so that the operator has perfect control of the truck and can guide and move the same to any point of the floor or surface along which the load is to be transported.

One of the important features of this invention is the fact that the load and the toggle operating member or yoke 25 is made use of for the purpose of controlling the lowering of the load by means of the handle. This is brought about as follows (see Figs. 5 and 6): At one side of the truck there is a manually operated tripping mechanism which comprises a treadle 31, which is pivoted at 32 to an arm or bracket 33, fixed to one side of the extended links 21, 22. Said treadle is provided with a nose or lug 34 which comes in contact with a stop 35 on said arm so that the treadle is held stiff against a certain downward movement relative to said arm, but is permitted to make use of said pivot, as a lever in acting upon the adjacent pivot 26 as a fulcrum. For this purpose the said treadle is provided with a lever extension 36 which, when the handle and the yoke are lowered, is brought in contact with said opposite pivot 26 so that upon pressing the foot upon the treadle, the action is such that the connecting pivot 24 of the toggle is brought past the line directly connecting the pivots 23, 26 in the position shown in Fig. 2. This "breaks" the toggle by a slight pressure of the foot, and the load imposed on the platform thereupon automatically acts upon the mechanism to return the parts to normal position shown in Fig. 1, said parts being then in position to be moved from underneath of a load or to be moved under a load. It will furthermore be seen that by the use of the described trip mechanism the toggle devices are set so that they may be automatically acted upon by the load, and the operator of the truck can control the lowering of the load in a desired manner and the handle and yoke will not be swung up forcibly. A slight modification of the stop device which holds the toggle effective to lock the load in raised position is shown in Fig. 7 and comprises a swinging member 36 which is pivoted on the pivot 26 and rests upon the links 21, 22 at each side of the truck. It need only rest upon one of said links if desired. Said swinging member has an upwardly extending stop 38 which is so located relatively to the socket or sleeve 6 in which the caster-wheel is swiveled that when the links are brought up to raised position as shown in Fig. 2, the said stop will strike the said socket or sleeve and thus the load cannot carry the toggle pivot 24 farther than is desirable to effect the intended purpose. Rollers 39 on yoke 25, Figs. 3 and 4, reduce the friction between the yoke and handle.

Obviously further modifications can be made in the construction of the truck described and claimed without departing from the spirit of the invention.

What I claim as new is:—

1. In a truck, the combination of a base, an upwardly movable platform thereon, a toggle connecting said base with said platform, and adapted to be maintained in a position to lock said platform raised, a toggle member for operating said toggle, manually operated means movable relatively to said toggle operating member, and adapted to actuate said member, and tripping means independent of said manually operated means to trip and release said toggle to lower said platform and comprising a foot-treadle extending to one side of said base in position for convenient access by the foot.

2. In a truck, the combination of a base, an upwardly movable platform thereon, a toggle connecting said base with said platform, and adapted to be maintained in a position to lock said platform raised, a toggle member for operating said toggle, manually operated means movable relatively to said toggle operating member, and comprising a handle or tongue pivoted to said base, and adapted to acutate said member, and tripping means independent of said manually operated means to trip and release said toggle to lower said platform and comprising a foot-treadle extending to one side of said base in position for convenient access by the foot, said toggle member permitting the handle to control the lowering of the load throughout.

3. In a truck, the combination of a support, a toggle pivotally connected therewith, a toggle member for operating said toggle in one direction, and a toggle stop consisting of a lug or toe projecting from said toggle and arranged in coöperative relationship to the connecting pivot between said toggle and said support, and controlled by said toggle when the toggle is operated, said pivot constituting an abutment for said stop.

4. In a truck, the combination of an upwardly movable platform, a handle, an upright swivel connecting said handle with the truck, means operable by said handle for raising said platform, said handle being free to be moved upon said swivel laterally of said means but being free to operate on said means at will, and a manually controlled lever combined with said parts and operable independently of said handle, for tripping said handle operated means when the platform is raised and to permit said handle to control the lowering of the load through the medium of said handle operated means.

5. In a truck, the combination of an upwardly movable platform, a handle or tongue suitably supported relative to said platform, said handle being freely movable in any direction relative to said platform, means operable by said handle for raising said platform by lowering said handle, said handle being free to be moved relative to said means when said platform is raised, and a manually controlled lever combined with said parts for tripping said handle operated means to permit said handle to control the lowering of the load through the medium of said handle operated means.

6. In a truck, the combination of a base, a movable platform, inclined coacting guides, on said base and platform, adapted to guide said platform upwardly and longitudinally, a toggle connected with said base near one end of said platform and comprising an extended link connected with the other end of said platform, a toggle member for operating said toggle to raise said platform, a handle or tongue pivoted to said base and adapted to actuate said member, and means independent of said handle or tongue to release said toggle to permit said handle to control the lowering of the load.

7. In a truck, the combination of a base, a movable platform, a toggle connected with said base near one end of said platform and comprising an extended link connected with the other end of said platform, means associated with said base and platform and coacting with said toggle to raise said platform from said base, a toggle member for operating said toggle to raise said platform, a handle or tongue pivoted to said base and adapted to actuate said member, and means independent of said handle or tongue to release said toggle to permit said handle to control the lowering of the load.

8. In a truck, the combination of a support, a toggle connected therewith, a platform, operable by said toggle, said toggle extending in the direction of the length of the truck when straightened out, a toggle member for operating said toggle in one direction relatively to said support, a movable toggle stop carried by and controlled by said toggle when the toggle is operated, and an abutment, located on said support between the extreme outer ends of said toggle for engagement laterally by said stop when the middle pivot of said toggle passes beyond a straight line extending between the end pivots thereof, said toggle-stop being laterally disengageable from said abutment at will, by the mere breaking of said toggle.

9. In a truck, the combination of a support, a toggle connected therewith, a platform operable by said toggle, a toggle member for operating said toggle in one direction relatively to said support, a movable toggle stop consisting of a lug or toe projecting from said toggle and controlled by said toggle when the toggle is operated, and an abutment for said stop, provided by an end pivot of said toggle.

10. In a truck, the combination of a support, a toggle connected therewith, a platform operable by said toggle, said toggle extending in the direction of the length of the truck when straightened out, a toggle member for operating said toggle in one direction relatively to said support, a movable toggle-stop consisting of a lug or toe projecting from said toggle at the intermediate pivot thereof, and an abutment, located on said support for engagement laterally by said stop when the middle pivot of said toggle passes beyond a straight line extending between the end pivots thereof, said lug or toe being laterally disengageable from said abutment at will, by the mere breaking of said toggle.

11. In a truck, the combination of a support, a toggle connected therewith, a platform, operable by said toggle, a toggle member for operating said toggle in one direction relatively to said support, a movable toggle stop carried by and controlled by said toggle when the toggle is operated, and an abutment for said stop, provided by an end pivot of said toggle.

Signed at Holyoke, Massachusetts, this first day of June, 1912.

GEORGE P. TAYLOR.

Witnesses:
G. A. WILENS,
A. L. LEWIS.

It is hereby certified that in Letters Patent No. 1,121,052, granted December 15, 1914, upon the application of George P. Taylor, of Holyoke, Massachusetts, for an improvement in "Trucks," an error appears in the printed specification requiring correction as follows: Page 1, line 88, for the word "trunk" read *truck;* and that the said Letters Patent should be read with this correction therein that the same may conform to the record of the case in the Patent Office.

Signed and sealed this 26th day of January, A. D., 1915.

[SEAL.] R. F. WHITEHEAD,
*Acting Commissioner of Patents.*